United States Patent
Marchlewski et al.

(10) Patent No.: US 10,549,790 B2
(45) Date of Patent: Feb. 4, 2020

(54) VEHICLE FLOOR DRAIN

(71) Applicant: Ford Global Technologies, LLC, Dearborn, MI (US)

(72) Inventors: Jack Marchlewski, Saline, MI (US); Robert Reiners, Grosse Ile, MI (US); Darrin Neil Wagner, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/964,308

(22) Filed: Apr. 27, 2018

(65) Prior Publication Data

US 2019/0329828 A1 Oct. 31, 2019

(51) Int. Cl.
*B62D 25/24* (2006.01)
*B60R 13/07* (2006.01)
*B62D 25/20* (2006.01)
*B60N 3/04* (2006.01)

(52) U.S. Cl.
CPC .............. *B62D 25/24* (2013.01); *B60N 3/04* (2013.01); *B60R 13/07* (2013.01); *B62D 25/20* (2013.01)

(58) Field of Classification Search
CPC ......... B60N 3/04; B60R 13/01; B60R 13/011; B60R 13/07; B62D 25/20; B62D 25/24
USPC ........................................ 296/97.23, 193.07
See application file for complete search history.

(56) References Cited

U.S. PATENT DOCUMENTS

| | | | | |
|---|---|---|---|---|
| 3,717,324 A * | 2/1973 | Milde | ................... | B62D 25/24 251/331 |
| 4,176,877 A * | 12/1979 | Schulz | ................... | B60R 13/07 296/154 |
| 4,953,742 A * | 9/1990 | Kraus | ................... | B62D 25/24 220/367.1 |
| 5,673,956 A | 10/1997 | Emery | | |
| 5,709,309 A | 1/1998 | Gallagher et al. | | |
| 6,290,279 B1 | 9/2001 | Haight et al. | | |
| 6,361,099 B1 | 3/2002 | McIntosh et al. | | |
| 9,494,234 B2 * | 11/2016 | Yagame | ................. | B62D 25/24 |

FOREIGN PATENT DOCUMENTS

DE 102013222997 A1 5/2015

* cited by examiner

*Primary Examiner* — Jason S Daniels
(74) *Attorney, Agent, or Firm* — Vichit Chea; Price Heneveld LLP (57) ABSTRACT

A vehicle flooring system including a floor. A flooring component is positioned above the floor to define a gap. A drain assembly is coupled with the flooring component which includes a plug having a one-way valve and defining a plug opening. A drain defines a drain aperture to accept the plug. The drain defines a drain opening in alignment with the gap.

20 Claims, 5 Drawing Sheets

VEHICLE FLOOR DRAIN

FIELD OF THE INVENTION

The present disclosure generally relates to vehicles, and more specifically, to vehicle floor drains.

BACKGROUND OF THE INVENTION

Off road vehicles may collect water inside of the vehicle from activities such as water fording or from washing out the vehicle's interior. Conventional water mitigation approaches use rubber plugs under floor coverings (e.g., carpets or mats) for draining water from the interior. In such approaches, both the floor covering and rubber plugs must be removed for water to be drained. Further, in vehicles with non-removable floor coverings, conventional water mitigation approaches may often result in water collection below the floor covering which may result in fouling.

SUMMARY OF THE INVENTION

According to at least one feature of the present disclosure, a vehicle flooring system includes a floor. A flooring component is positioned above the floor to define a gap. A drain assembly is coupled with the flooring component which includes a plug having a one-way valve and defining a plug opening. A drain defines a drain aperture to accept the plug. The drain defines a drain opening in alignment with the gap.

According to another feature of the present disclosure, a vehicle flooring system includes a flooring component positioned above a floor to define a gap. A drain assembly includes a plug having a plug opening. A drain is coupled to the floor and configured to accept the plug and defines a drain opening in alignment with the gap. The plug is operable between a closed position where the plug opening and drain opening are aligned and an intermediate position where the plug opening and drain opening are not aligned.

According to another feature of the present disclosure, a vehicle flooring system includes a flooring component positioned above a floor to define a gap. A drain assembly is coupled with the flooring component and includes a drain which defines a drain aperture. The drain defines a drain opening in alignment with the gap. A plug is threadably engaged within the aperture of the drain having a one-way valve and defines a plug opening in alignment with the gap and the drain opening.

These and other features, advantages, and objects of the present disclosure will be further understood and appreciated by those skilled in the art by reference to the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring now to FIGS. 1-3C, depicted is a vehicle 10 including a vehicle flooring system 14. The vehicle flooring system 14 includes a floor 18, and a flooring component 22 positioned above the floor 18 to define a gap 26. A drain assembly 30 is coupled to the flooring component 22. The drain assembly 30 includes a plug 34. The plug 34 includes a one-way valve 38 and defines a plug opening 42. The drain assembly 30 also includes a drain 46 defining drain aperture 50 configured to accept the plug 34. The drain 46 defines a drain opening 54 in alignment with the gap 26.

Figure 1:
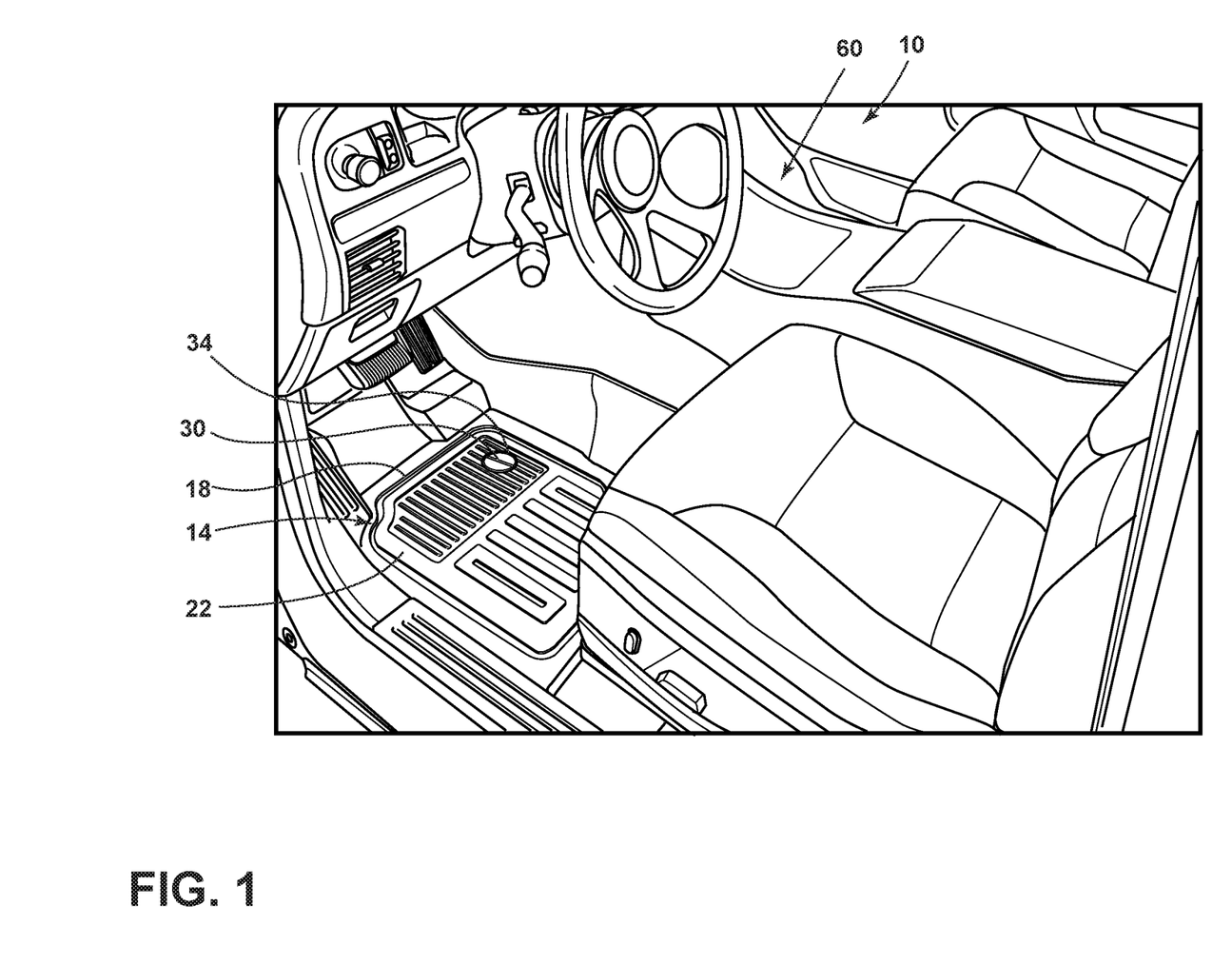
FIG. 1 is a perspective view of a vehicle interior including a flooring system, according to at least one example.

Referring now to FIG. 1, the vehicle 10 is depicted as a sport utility vehicle, but it will be understood that the vehicle 10 may be a sedan, van, truck, cross-over or other vehicle 10 without departing from the teachings provided herein. The flooring system 14 is positioned along a base of an interior 60 of the vehicle 10. In the depicted example, the flooring system 14 is positioned in a driver foot well, but it will be understood that the flooring system 14 may be positioned in other locations around the vehicle 10. For example, flooring system 14 may be positioned on in the middle of the vehicle 10, on a passenger side, in a second row of seating, in a third row of seating and in trunk or cargo storage areas without departing from the teachings provided herein. Although the flooring system 14 is depicted as having a single drain assembly 30, it will be understood that the flooring system 14 may include a two or more drain assemblies 30 either spaced across the vehicle 10 and/or proximate one another without departing from the teachings provided herein.

Figure 2A:
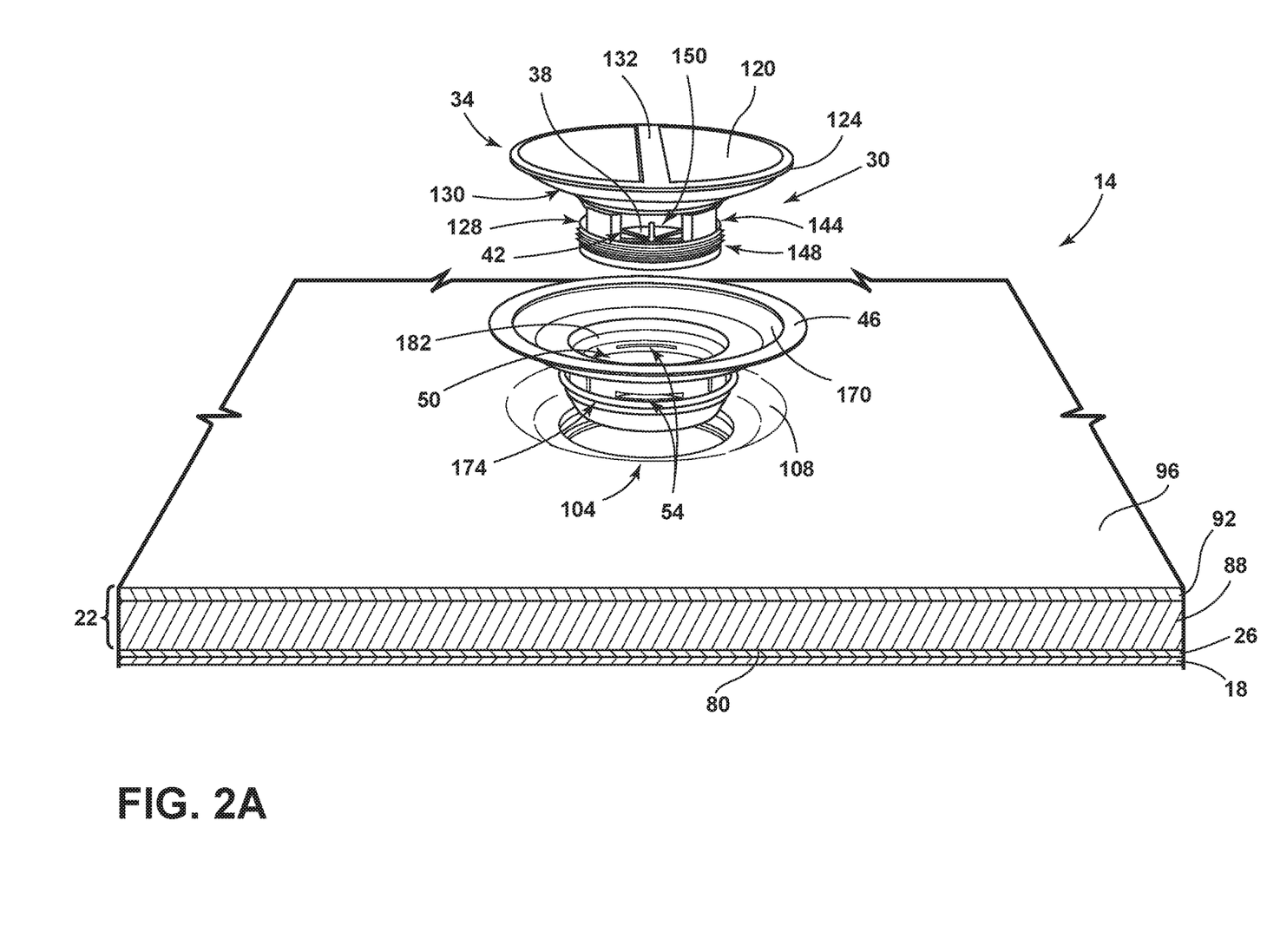
FIG. 2A is an exploded view of the flooring system of FIG. 1, according to at least one example.
Figure 2B:
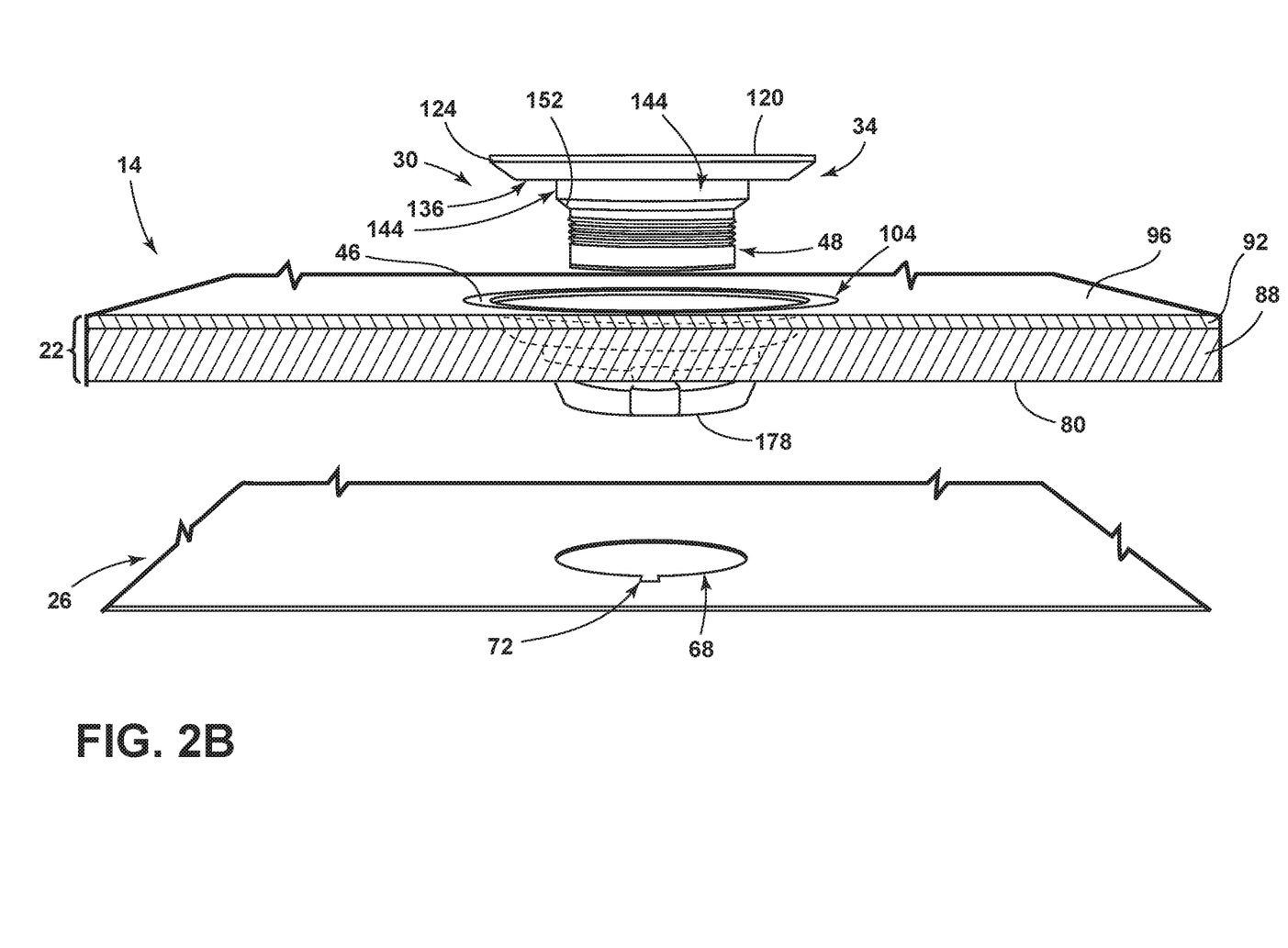
FIG. 2B is an exploded view of the flooring system of FIG. 1, according to at least one example.
Figure 2C:
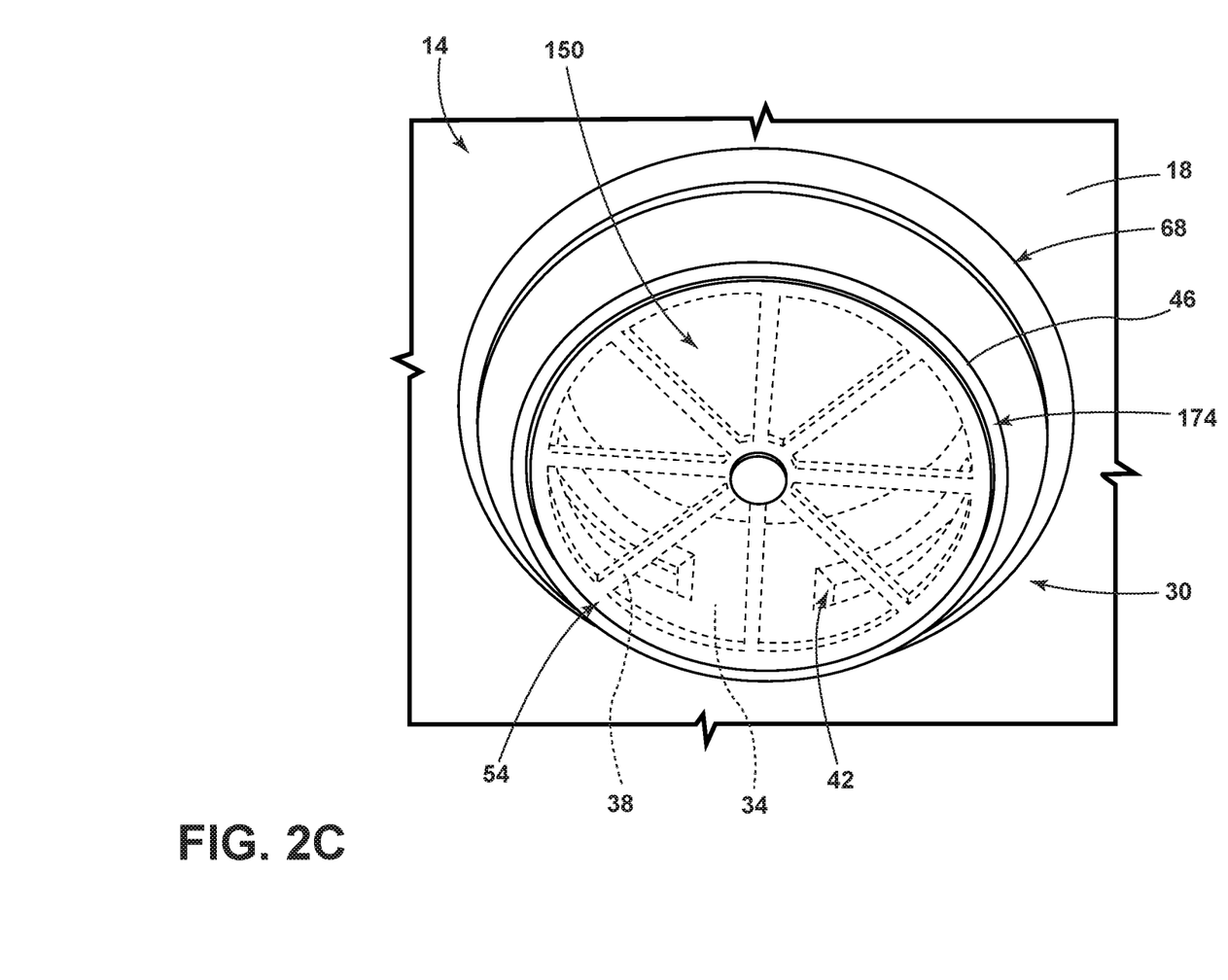
FIG. 2C is a perspective view of a drain assembly, according to at least one example.

Referring now to FIGS. 2A-2C, the floor 18 is positioned below the flooring component 22 and may be composed of a metal, polymer, composite material and/or combinations thereof. According to various examples, the floor 18 may be the exterior or underside component of the vehicle 10 or may be another structure. The floor 18 may extend across the vehicle 10 as a single unitary component, or may be composed of a plurality of components. As will be explained in greater detail below, the floor 18 may define one or more floor openings 68 through which the drain 46 and/or the plug 34 of the drain assembly 30 may extend. In such examples, the floor 18 may define a key way notch 72 off of the floor opening 68. The key way notch 72 may be used to resist rotation of the drain assembly 30 as it is manipulated by a user as explained in greater detail below. For example, the drain assembly 30 may engage the key way notch 72 (e.g., through a protrusion, locking mechanism or engagement feature) such that the drain assembly 30 resists rotation.

The flooring component 22 is positioned over the floor 18 such that the gap 26 is formed between the floor 18 and the flooring component 22. In other words, an interior surface 80 of the flooring component 22 which is a generally downward or outboard facing surface of the flooring component 22 may be generally separated from the floor 18 to define the gap 26. The gap 26 may have a height, as measured from the floor 18 to the interior surface 80 of from about 0.1 mm to about 10 mm. For example, the gap 26 may have a height of about 10 mm or less, about 5 mm or less, about 4 mm or less, about 3 mm or less, about 2 mm or less, about 1 mm or less, about 0.9 mm or less, about 0.8 mm or less, about 0.7 mm or less, about 0.6 mm or less, about 0.5 mm or less, about 0.4 mm or less, about 0.3 mm or less, about 0.2 mm or less, about 0.1 mm or less or any and all values and ranges therebetween. The height of the gap 26 may vary with location across the floor 18 and/or flooring component 22 and/or may be substantially constant. The gap 26 may be formed intentionally (e.g., by spacers, attachment features, etc.) or by the fit (e.g., tolerancing) of the flooring component 22 to the floor 18. As will be explained in greater detail below, use of the presently disclosed flooring system 14 and drain assembly 30 may be advantageous in allowing water and/or moisture to escape from the gap 26 to an exterior of the vehicle 10.

The flooring component 22 may take a variety of shapes and configurations depending on the use of the vehicle 10 and/or position of the flooring component 22 within the vehicle 10. For example, the flooring component 22 may extend across a variety of locations within the vehicle 10 and/or or be positioned in discrete locations (e.g., driver and/or passenger foot wells, cargo areas, etc.). In the depicted example, the flooring component 22 is a two layer structure, but it will be understood that the flooring component 22 may be a single layer structure or may have greater than two layers. The flooring component 22 may include a foam layer 88 and a water resistant layer 92. The foam layer 88 may aid in noise, harshness or vibration dampening while the vehicle 10 is operating. The foam layer 88 may be composed of an open-cell and/or closed-cell foam. The water resistant layer 92 may be formed over a portion, a majority, substantially all or all of the foam layer 88. The water resistant layer 92 may be composed of a thermoplastic Polyolefin, vinyl, high density polyethylene, low density polyethylene, other polymeric material, and/or combinations thereof. The water resistant layer 92 may define an exterior surface 96 exposed to the interior 60 of the vehicle 10.

According to various examples, the flooring component 22 may define an aperture 104 to couple the drain assembly 30. The aperture 104 generally extends from the top surface 96 to the interior surface 80 of the flooring component 22. The aperture 104 is depicted as generally circular, but it will be understood that the aperture may be triangular, square, rectangular or higher order polygons without departing form the teachings provided herein. The aperture 104 may be sized to fit the drain assembly 30, of may be slightly smaller such that the drain assembly 30 may be friction fit into the aperture 104.

The flooring component 22 may define a recess 108 positioned around the aperture 104 to which the drain assembly 30 couples. The recess 108 may be defined by the water resistant layer 92 and/or may be defined by the foam layer 88. In other words, the recess 108 may be formed by a relative thinning of the water resistant layer 92, the foam layer 88 and/or the flooring component 22 as a whole. The recess 108 may have the same general shape as the aperture 104 (e.g., circular) or may be different depending on the relative shapes of the plug 34, drain 46 and/or drain assembly 30. In the depicted example, the recess 108 generally curves in an upward manner from the aperture 104 to the exterior surface 96 of the water resistant layer 92, but it will be understood that the recess 108 may extend linearly, in a step-wise manner or in other manners from the aperture 104 to the exterior surface 96. The drain 46 and/or the plug 34 may couple to the recess 108. As such, according to various examples, the flooring component 22 defines the recess 108 around the aperture 104 to which the drain 46 couples. In such examples, the drain 46 is positioned within the recess 108.

As explained above, the drain assembly 30 includes the plug 34. The plug 34 may define a top surface 120 on a lid 124 and a body 128. According to various examples, the top surface 120 may be generally, substantially or completely planar with the exterior surface 96 of the flooring component 22 when the plug 34 is fully seated or positioned within the drain 46 of the drain assembly 30. Such a feature may be advantageous in preventing occupants of the vehicle 10 from inadvertently kicking the plug 34 and/or preventing the plug 34 from being a toe catch. According to various examples, the top surface 120 of the plug 34 may define or include a handle 132 or grab point. The handle 132 may be used to rotate, grip and or pull the plug 34 from the drain assembly 30 and flooring system 14 as explained in greater detail below. The handle 132 may be raised or lowered relative to the top surface 120 of the Rd 124 of the plug 34. The lid 124 defines an underside 136 which is shaped to couple with the drain 46 and fit into the recess 108.

The body 128 of the plug 34 is positioned below the lid 124. The body 128 of the plug 34 is sized and shaped to pass through the aperture 104, the drain 46 and the flooring component 22. In the depicted example, the body 128 includes an upper portion 144 and a lower portion 148, each with different diameters. A plug cavity 150 is defined within the body 128 of the plug 34. The body 128 of the plug 34 defines an engagement surface 152 at the transition zone between the upper and lower portions 144, 148. The plug 34 defines the plug opening 42 below the engagement surface 152 in the lower portion 148. In the depicted example, the plug 34 defines two plug openings 42, but it will be understood that the plug 34 may define a single plug opening 42 or more than two plug openings 42. According to various examples, the plug 34 defines a plurality of plug openings 42 positioned in a radially spaced apart configuration around the plug 34.

According to various examples, the plug 34 defines plug threads 160 positioned around an exterior surface of the lower portion 148. As explained in greater detail below, the plug threads 160 may be used to secure the plug 34 within the drain 46 such that the plug 34 is secured within the drain assembly 30. As such, the plug 34 may be threadbly engaged within the drain 46. It will be understood that other features may be used to secure the plug 34 within the drain 46 such as clips, retention and engagement features and/or detents.

Positioned at a base of the lower portion 148 and the plug cavity 150 is the one-way valve 38. In other words, the one-way valve 38 is positioned below the plug opening 42. It will be understood that the one-way valve 38 may also be referred to as a check valve, a clack valve, a non-return valve, a reflux valve, a retention valve or by other terms. The one-way valve 38 may take a variety of configurations. In a first example, the one-way valve 38 may be a diaphragm check valve which uses a flexing rubber diaphragm positioned to create a normally-closed valve. In a second example, the one-way valve 38 may be a swing check valve or tilting disc check valve in which a disc (e.g., the movable part to block the flow) swings on a hinge or trunnion, either onto the seat to block reverse flow or off the seat to allow forward flow. In a third example, the one-way valve 38 may be a top-check valve which is a check valve with override control to stop flow regardless of flow direction or pressure. In a fourth example, the one-way valve 38 may be a lift-check valve which is a check valve in which a disc or lift can be lifted up off its seat by higher pressure of inlet or upstream fluid to allow flow to the outlet or downstream side. In a fifth example, the one-way valve 38 may be an in-line check valve which is a check valve which has a spring that will lift when there is pressure on the upstream side of the valve. In a sixth example, the one-way valve 38 may be a duckbill valve which is a check valve in which flow proceeds through a soft tube that protrudes into the downstream side and in which back-pressure collapses the tube thereby cutting off flow. It will be understood that the plug 34, the plug openings 42 and the one-way valve 38 combined may form all the components of the examples of the one-way valves 38 described above. The one-way valve 38 is configured to allow moisture or water present within the plug cavity 150 to exit the plug 34, while preventing a back flow of water into the plug cavity 150 from below the plug 34. Although depicted as extending across an entirety of the lower portion 148 and/or the plug cavity 150, it will be understood that the one-way valve 38 may only extend across a portion, a majority or substantially across the lower portion 148. According to various examples, the one-way valve 38 is substantially planar with a bottom of the drain 46.

As explained above, the drain 46 is positioned within the recess 108 and the aperture 104 of the flooring component 22. The drain 46 includes a drain basin 170, a drain body 174 and the drain aperture 50. According to various examples, the drain 46 extends through the floor opening 68 defined in the floor 18. In other words, the drain 46 may extend through the floor 18.

The drain basin 170 is sized and shaped to couple, or fit, within the recess 108 of the flooring component 22. In the depicted example, the drain basin 170 has a generally linearly segmented cross-sectional shape extending up from the drain body 174, but it will be understood that the drain basin 174 may generally extend upwardly in a curved and/or in a step-wise manner from the drain aperture 50 to meet the exterior surface 96 of the flooring component 22.

The drain body 174 extends around the drain aperture 50. The drain body 174 may extend generally inward to define a drain shed lip 182 positioned above the drain opening 54. According to various examples, the drain shed lip 182 may extend in a generally inward direction relative to the drain aperture 50 at an angle. Use of the drain shed lip 182 may be advantageous in preventing moisture or water present on the exterior surface 96 and flowing down the drain basin 170 from entering the drain opening 54 and entering the gap 26.

The drain shed lip 182 may extend around a circumference of the drain aperture 50 or may be defined a plurality of discrete lips 182 around the drain body 174. As will be explained in greater detail below, the drain shed lip 182 is configured to engage the plug 34 at the engagement surface 152.

The drain body 174 of the drain 46 defines the drain opening 54. The drain opening 54 is generally aligned with the gap 26 such that moisture or water present within the gap 26 may drain from the gap 26 and into the drain aperture 50 of the drain 46. For purposes of this disclosure, aligned means that the features which are aligned overlap sufficiently for liquid water to pass. The drain body 174 may define a single drain opening 54 or a plurality of drain openings 54. In examples where the drain body 174 defines a plurality of drain openings 54, the drain openings 54 may be in a radially spaced apart configuration around the drain body 174. According to various examples, the drain opening 54 or plurality of drain openings 54 may be positioned above the one-way valve 38.

According to various examples, the drain body 174 may define a second drain shed lip 188 positioned below the drain opening 54. The second drain shed lip 188 may extend in a generally inward direction relative to the drain aperture 50 at an angle similarly to the drain shed lip 182. The angle of the second drain shed lip 188 may be the same or different than the drain shed lip 182. Similarly to the drain shed lip 182, the second drain shed lip 188 may extend around a circumference of the drain aperture 50 or may be composed of a plurality of discrete second drain shed lips 188. Although depicted as below the floor 18, it will be understood that the drain body 174 and/or the second drain shed lip 188 may be sized or shaped to be positioned above or planar with the floor 18.

The drain body 174 may define drain threads 192 positioned on an internal side of the drain body 174 below the drain opening 54 and the second drain shed lip 188. The drain threads 192 may be configured to engage the plug threads 160 of the plug 34 to retain the plug 34 in place. As explained above in connection with the plug threads 160, the drain threads 192 may similarly additionally or alternatively include other features to secure the plug 34 within the drain 46 such as clips retention and engagement features and/or detents.

According to various examples, the drain assembly 30 may include a seal 196 positioned around the drain 46 at the interface between the drain body 174 and the floor 18. The seal 196 may include an O-ring, a gasket, a sealant or other material configured to ensure a water tight and/or air tight seal between the drain 46 and the floor 18. Such a feature may be advantageous in preventing water and/or gases (e.g., exhaust fumes) present beneath the vehicle 10 from entering the vehicle 10.

Figure 3A:
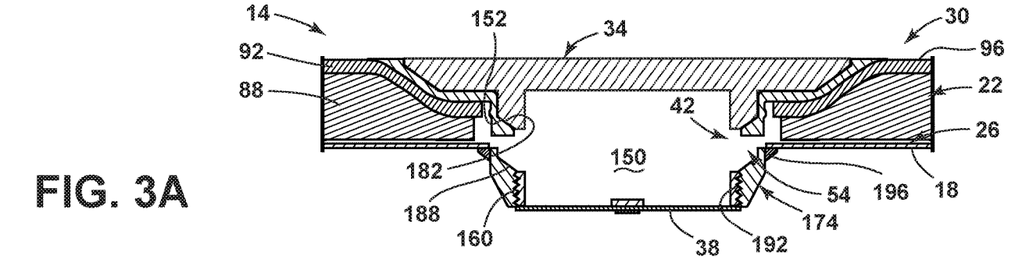
FIG. 3A is cross-sectional view of the flooring system with the drain assembly in a closed position, according to at least one example.
Figure 3B:
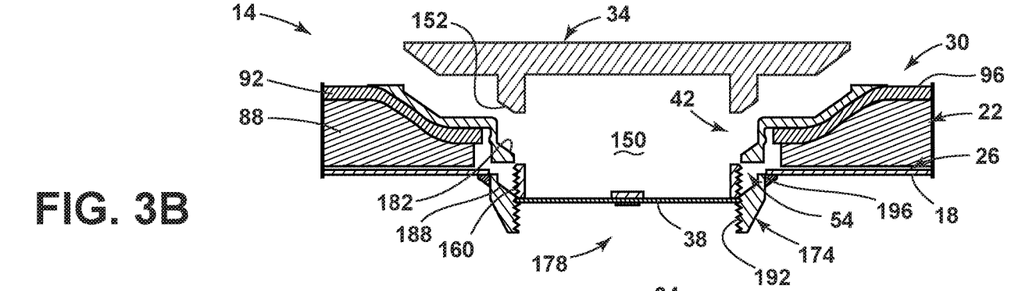
FIG. 3B is cross-sectional view of the flooring system with the drain assembly in an intermediate position, according to at least one example.
Figure 3C:
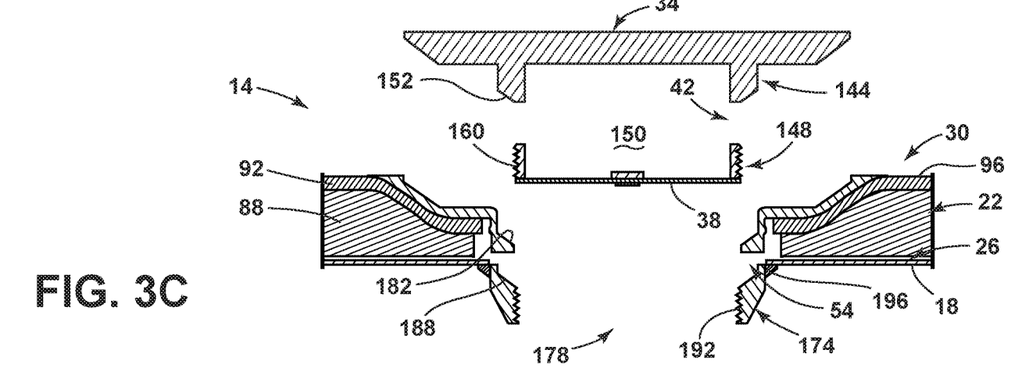
FIG. 3C is cross-sectional view of the flooring system with the drain assembly in an open position, according to at least one example.

Referring now to FIGS. 3A-3C, in operation, the drain assembly 30 is operable between three positions. Namely, the drain assembly 30 is operable between a closed position (FIG. 3A), an intermediate position (FIG. 3B) and an open position (FIG. 3C). In the closed position, the plug 34 is threadably engaged within the drain aperture 50 of the drain 46 through the plug threads 160 and the drain threads 192. Further, in the closed position, the drain shed lip 182 and the engagement surface 152 of the plug 34 may be seated or coupled to provide an active stop to the plug 34 in the drain 46. In the closed position, the drain assembly 30 is configured to passively drain water or moisture present within the gap 26. Passive draining of the gap 26 is accomplished by alignment of the plug opening 42 and the drain opening 54. In other words, the plug 34 is configured to couple with the drain 46 such that the plug opening 42 and the drain opening 54 are in alignment with the gap 26 when the drain assembly 30 is in a closed position. Alignment of the plug opening 42 and the drain opening 54 allows for moisture or water present in the gap 26 to flow into the plug cavity 150 and when sufficient water accumulates to pass through the one-way valve 38 and to an exterior of the vehicle 10 as the one-way valve 38 is positioned below the floor 18.

In the intermediate position, the drain assembly 30 may actively drain water or moisture present on the exterior surface 96 of the flooring component 22. In the intermediate position of the drain assembly 30, the plug opening 42 and drain opening 54 are not aligned, but the plug opening 42 is aligned with the drain shed lip 182 of the drain body 174. The intermediate position of the drain assembly 30 alignment of the plug opening 42 with the drain shed lip 182 allows water or moisture present on the exterior surface 96 of the flooring component 22 to flow down the drain basin 170, over the drain shed lip 182 and into the plug cavity 150 of the plug 34. Once sufficient water has accumulated in the plug cavity 150, the one-way valve 38 may open to drain the water to the exterior of the vehicle 10. As the lower portion 148 of the plug 34 blocks the drain opening 54 in the intermediate position, water or moisture flowing into the plug cavity 150 may be prevented from entering the gap 26.

In the open position, the plug 34 of the drain assembly 30 may be fully removed from the drain 46 such that both passive and active draining of moisture from the vehicle 10 may be achieved. For example, as the plug 34 is removed, both water present on the exterior surface 96 and within the gap 26 may flow through the drain 46 and to an exterior of the vehicle 10. Further, as the drain shed lip 182 is positioned above the drain opening 54, water flowing from the exterior surface 96 into the drain 46 is directed away from the drain opening 54 such that water entrainment in the gap 26 is minimized.

Use of the present disclosure may offer a variety of advantages. First, as conventional flooring designs may require the entire removal of the floor to drain all water and moisture present, use of the presently disclosed drain assembly 30 allows the flooring system 14 to remain in place while draining water. Such a feature may be advantageous in alleviating the work of a user to fully dry the flooring system 14. Second, as the drain assembly 30 is operable between a variety of positions, a user of the drain assembly 30 may choose which draining scheme is correct for the situation. Third, as the drain 46 includes the drain shed lip 182, the probability of water becoming entrained in the gap 26 during draining is greatly reduced.

According to various examples, a vehicle flooring system includes a floor, a flooring component positioned above the floor to define a gap and a drain assembly coupled with the flooring component. The drain assembly includes a plug including a one-way valve and defining a plug opening and a drain defining a drain aperture to accept the plug. The drain defines a drain opening in alignment with the gap. Embodiments of the present disclosure may include one or a combination of the following features:

- the plug defines a plurality of plug openings positioned in a radially spaced apart configuration around the plug;
- the plurality of drain openings are positioned above the one-way valve;
- the drain defines a plurality of drain openings positioned in a radially spaced apart configuration around the drain;

the flooring component defines an aperture to couple the drain assembly;

the flooring component defines a recess around the aperture to which the drain couples;

the drain is positioned within the recess;

the drain extends through a floor opening defined in the floor;

a top surface of the plug is substantially planar with an exterior surface of the flooring component;

the plug is configured to couple with the drain such that the plug opening and the drain opening are in alignment with the gap when the plug drain assembly is in a closed position;

the drain defines a drain shed lip positioned above the drain opening; and/or the plug is configured to couple with the drain such that the plug opening is in alignment with the drain shed lip when the plug drain assembly is in an intermediate position.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

What is claimed is:

1. A vehicle flooring system, comprising:
   a floor;
   a flooring component positioned above the floor to define a gap; and
   a drain assembly coupled with the flooring component comprising:
      a plug comprising a one-way valve and defining a plug opening; and
      a drain defining a drain aperture to accept the plug, wherein the drain defines a drain opening in alignment with the gap.

2. The vehicle flooring system of claim 1, wherein the plug is configured to couple with the drain such that the plug opening and the drain opening are in alignment with the gap when the drain assembly is in a closed position.

3. The vehicle flooring system of claim 1, wherein the drain defines a drain shed lip positioned above the drain opening.

4. The vehicle flooring system of claim 3, wherein the plug is configured to couple with the drain such that the plug opening is in alignment with the drain shed lip when the drain assembly is in an intermediate position.

5. The vehicle flooring system of claim 1, wherein the plug defines a plurality of plug openings positioned in a radially spaced apart configuration around the plug.

6. The vehicle flooring system of claim 5, wherein the plurality of drain openings are positioned above the one-way valve.

7. The vehicle flooring system of claim 1, wherein the drain defines a plurality of drain openings positioned in a radially spaced apart configuration around the drain.

8. The vehicle flooring system of claim 1, wherein the flooring component defines an aperture to couple the drain assembly.

9. The vehicle flooring assembly of claim 8, wherein the flooring component defines a recess around the aperture to which the drain couples.

10. The vehicle flooring assembly of claim 9, wherein the drain is positioned within the recess.

11. The vehicle flooring assembly of claim 1, wherein the drain extends through a floor opening defined in the floor.

12. The vehicle flooring assembly of claim 1, wherein a top surface of the plug is substantially planar with an exterior surface of the flooring component.

13. A vehicle flooring system, comprising:
    a flooring component positioned above a floor to define a gap; and
    a drain assembly, comprising:
       a plug comprising a plug opening; and
       a drain coupled to the floor and configured to accept the plug and defining a drain opening in alignment with the gap, wherein the plug is operable between a closed position where the plug opening and drain opening are aligned and an intermediate position where the plug opening and drain opening are not aligned.

14. The vehicle flooring system of claim 13, wherein the plug comprises a one-way valve positioned below the plug opening.

15. The vehicle flooring system of claim 13, wherein the drain defines a drain shed lip configured to engage the plug.

16. A vehicle flooring system, comprising:
    a flooring component positioned above a floor to define a gap; and
    a drain assembly coupled with the flooring component comprising:
       a drain defining a drain aperture, wherein the drain defines a drain opening in alignment with the gap; and
       a plug threadably engaged within the aperture of the drain comprising a one-way valve and defining a plug opening in alignment with the gap and the drain opening.

17. The vehicle flooring system of claim 16, wherein the drain defines a drain shed lip extending around a circumference of the aperture.

18. The vehicle flooring system of claim 16, wherein the plug comprises a one-way valve substantially planar with a bottom of the drain.

19. The vehicle flooring system of claim 18, wherein the drain extends through the flooring component.

20. The vehicle flooring system of claim 19, further comprising:
    a seal positioned around the drain at an interface between the drain and the floor.

* * * * *